J. A. BROWNFIELD.
BRAKE SHOE FOR STREET RAILWAY CARS.
APPLICATION FILED MAR. 19, 1909.

949,753.

Patented Feb. 22, 1910.

2 SHEETS—SHEET 1.

Witnesses.
A. McCormack
E. W. McCalister

Inventor,
James A. Brownfield
By Walker F. Murray
his Attorney.

J. A. BROWNFIELD.
BRAKE SHOE FOR STREET RAILWAY CARS.
APPLICATION FILED MAR. 19, 1909.
949,753.
Patented Feb. 22, 1910.
2 SHEETS—SHEET 2.
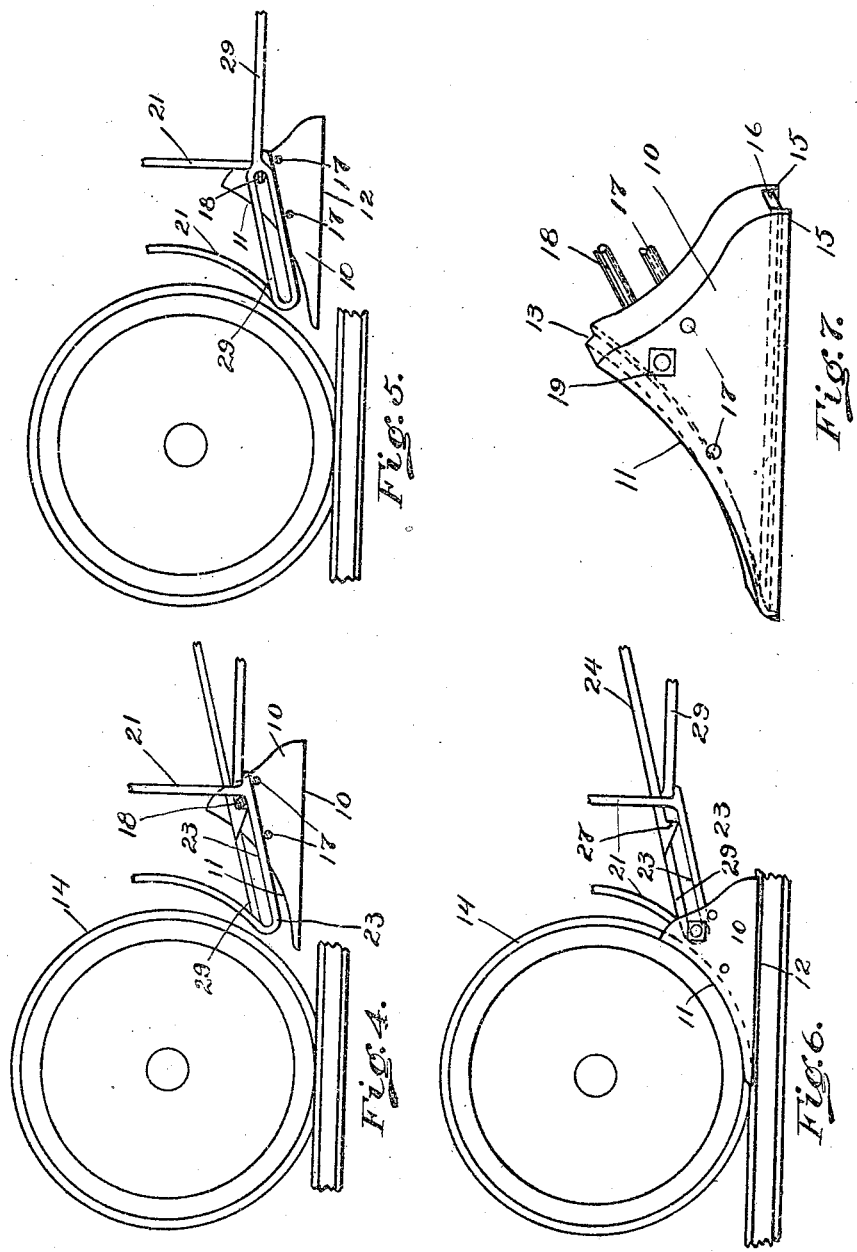
Witnesses.
A. McCormack
E. M. McCallister
Inventor,
James A. Brownfield
By Walter F. Murray
his Attorney.

UNITED STATES PATENT OFFICE.

JAMES A. BROWNFIELD, OF COVINGTON, KENTUCKY.

BRAKE-SHOE FOR STREET-RAILWAY CARS.

949,753.  Specification of Letters Patent.  Patented Feb. 22, 1910.

Application filed March 19, 1909. Serial No. 484,426.

*To all whom it may concern:*

Be it known that I, JAMES A. BROWNFIELD, a citizen of the United States of America, and resident of Covington, county of Kenton, State of Kentucky, have invented certain new and useful Improvements in Brake-Shoes for Street-Railway Cars, of which the following is a specification.

This invention relates to safety or emergency brakes for rail traversing trucks.

In localities where heavy grades are encountered, it is particularly essential to provide electric cars and other rail traversing vehicles with safety or emergency brakes, and it is important that these brakes should be simple to operate, and quick, true and effective in their operation.

The object of my invention is the production of such a brake. This, and other objects I attain in an apparatus embodying the features herein described and illustrated.

Figure 1:
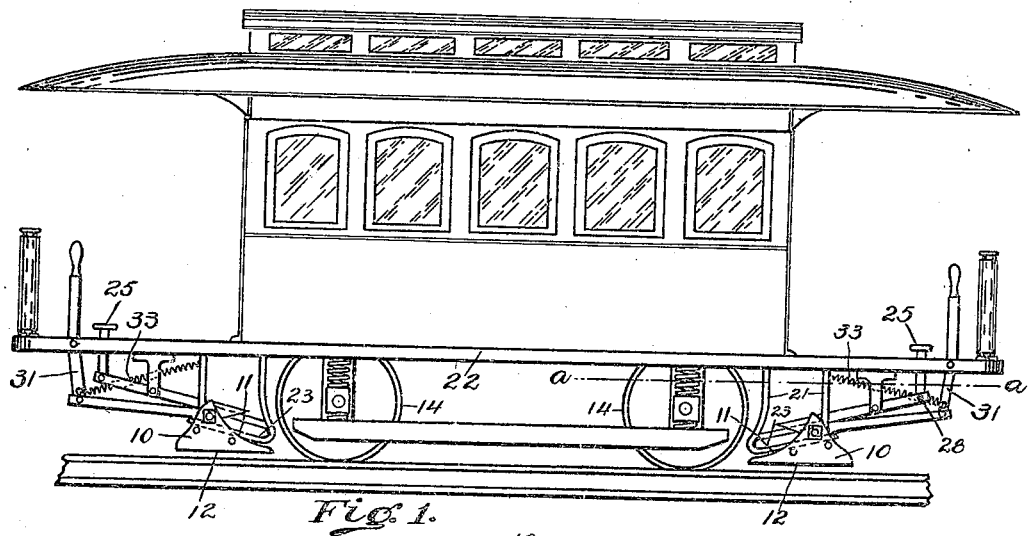
Figure 2:
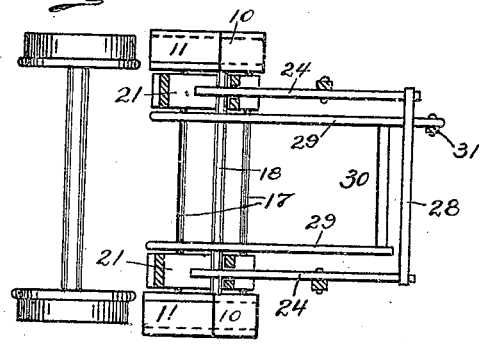
Figure 3:
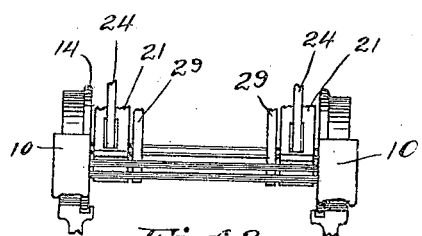

In the drawings accompanying this application, and forming a part thereof; Figure 1 is a side elevation of street car equipped with the emergency brake apparatus embodying my invention. Fig. 2 is a partial section along the line $a$—$a$ of Fig. 1. Fig. 3 is a partial end view of the apparatus shown in Fig. 2. Fig. 4 diagrammatically illustrates the brake supporting frame and a release lever for holding the brake in the operative position. Fig. 5 is a view similar to Fig. 4 and discloses a readjusting link employed in raising the brake from the operative to the inoperative position. Fig. 6 illustrates the brake in the operative position. And Fig. 7 is a perspective view of a brake shoe embodied in my invention.

The brake embodying my invention consists of a pair of brake shoes, which are adapted to be moved from an inoperative position, a little above the rails, to an operative position upon the rails. Each shoe is so constructed that it will permit one of the car wheels to mount it and it will then support the wheel above and free from the rail during the operation of the brake and until the car is brought to a stop. While the brake is in the operative position, the wheel rests on the brake shoe, and aside from transmitting pressure to the shoe, is a passive agent in bringing the car to a stop. The friction between the brake shoe and the rail is alone effective in stopping the car.

Each car may be provided with two sets of brakes, as illustrated in Fig. 1; one to stop the car when it is running in one direction and one to stop it when it is running in the reverse direction.

Referring to the drawings: the emergency brake consists of a pair of brake shoes 10 which are permanently secured together and which are adapted to engage the rails and to support one pair of the car wheels while the brake is in operation. Each shoe 10 is provided with a wheel engaging face 11 and a rail engaging face 12. The wheel engaging face is curved and is so located, relative to the face 12, and is of such contour that it presents an easy curve, up which the wheel may roll when the shoe is in the operative position on the rail. The major portion of the face 11 corresponds in contour to the curvature of the periphery of the car wheel and the shoe is of such height, relative to the size of the wheel and the length of the shoe base, that it cannot be overturned by the wheel. A groove 13 is provided in the face 11 of each shoe and is adapted to receive the flange 14 of the car wheel when the wheel is in place on the shoe. The rail engaging face 12 of each shoe 10 engages the rail when the shoe is in the operative position. Flanges 15 are provided on the shoe at each side of the face 12 and project downwardly on each side of the rail and are adapted to hold the shoe in place on the rail during the operation of the brake.

I find it preferable to provide a separate piece 16 of hardened steel, which is secured in place on each shoe between the flanges 15 and which presents a hardened gripping surface to the rail.

The two shoes forming a pair are located on opposite sides of the car, immediately in front of one pair of the car wheels, and are secured together by means of two parallel stay rods 17 and a rotatable rod or roller 18. The stay rods 17 are rigidly secured to the shoes and extend across the car at right angles to the direction of the rails. The roller 18 extends parallel to the rods 17 and is journaled at each end in a bearing 19, which is provided in each shoe 10. Any suitable means may be employed for preventing the roller 18 from moving laterally relative to the shoes 10, such, for example, as collars, formed on the roller and engaging suitably located shoulders provided on the bearings. The roller 18 is adapted to suspend the brake shoes 10 in the inoperative position, as shown in Fig. 1, and is supported, while the shoes are in the inoperative position, by means of a frame 21, which is rigidly mounted on the car body, 22. This frame 21 is formed in two parts, one of which is located near each shoe 10. Each part of the frame is provided with an inclined face or way 23, down which the roller is adapted to move in carrying the brake shoes from the inoperative to the operative position. The frame is so arranged that the brake shoes are absolutely free of the car body when in the operative position. This is accomplished by so locating the inclined faces 23, that the roller 18 will move out of engagement with them when the brake shoes 10 are in place on the rails and against the wheels. With this arrangement absolutely no strains are transmitted to the frame 21, while the brake is in operation. When the shoes 10 are in the inoperative position, the roller 18 is held in place on the inclined ways 23 by means of trip levers 24, which are mounted on the car body 22 and are operated by means of a foot plug 25, located on the car platform. The lower end of each trip lever 24 is provided with a notch 27, which is adapted to engage the roller 18, and to hold it in place on the ways 23. One of the trip levers 24 is located adjacent to each shoe 10 and the two levers are connected together by means of a bar 28, which is engaged by the foot plug 25. The stay rods 17 are so located, relative to the roller 18, that they engage the lower faces of the ways 23 and thereby steady and hold the brake shoes in place, while they are in the inoperative position and while they are moving down the ways to the operative position.

A pair of readjusting links or slotted arms 29 are provided for moving the brake shoes from the operative to the inoperative position. These links are located adjacent to the trip levers 24, and are adapted to engage the roller 18, and to raise the shoes from the rails to the inoperative position, by moving the roller 18 up the inclined ways 23. The links 29 are secured together by means of a cross link 30 and are operated by means of a lever 31, which is fulcrumed on the car body 22 and presents an operating handle on the platform of the car.

The operation of the brake is as follows: When the brake is in the inoperative position, it is supported by the frame 21 and is held in place on the ways 23 by means of the trip levers 24. When the trip lever is operated, its lower end is raised so as to release the roller 18 and permit it to roll down the inclined ways. The weight of the brake shoes and their inertia move them from the inoperative to the operative position, and cause them to engage the rail. In moving down the inclined ways, the toe of each shoe is engaged between the adjacent wheel and the rail prior to the time that the shoe is in place on the rail. This engagement forces the shoes quickly to place. The wheels then mount the shoes and are supported on the wheel engaging faces 11. After the brake is released by the trip levers 24, the shoes are practically free from the frame 21, and the body 22 of the car. There is nothing to prevent the shoes from moving quickly to place on the rails and receiving the wheels. The retarding force caused by the friction between the brake shoes and the rails is transmitted to the car through the wheels only. After the car has come to a stop, it may be reversed for the purpose of rolling the wheels off of the brake shoes and thereby releasing the shoes. When they are released, the lever 31 is operated, so that the links 29 engage the roller 18 and raise the brake shoes along the inclined ways 23 to the inoperative position, where they are again secured in place by means of the trip levers 24. This link is then moved to its lower or inoperative position, so that it will not impede or prevent the brake from rolling down the inclined ways to the operative position. Any suitable means, such as a spring, 33, may be employed to hold the links 29 in their lower position.

In accordance with the patent statutes, I have illustrated and described what I now consider to be a preferred embodiment of my invention, but I desire to be understood that I do not limit myself to the apparatus shown, and that various changes and modifications may be made without departing from the spirit and scope of my invention.

What I claim is:

1. In combination in a brake, a pair of brake shoes, a frame provided with an inclined way down which said shoes are adapted to move by gravity, a trip lever for holding said shoes in place in an inoperative position on said frame, and means for releasing said lever whereby said shoes are caused to move down said ways to an operative position.

2. In combination in a brake, a pair of brake shoes each provided with a rail engaging face, and a wheel engaging face, a frame provided with an inclined way, a roller journaled in said shoes for supporting said shoes on said way, and a trip lever for securing said shoes in an inoperative position on said way.

3. In combination in a brake for cars the combination of frames secured to the car adjacent to the wheels, said frames having inclined ways, a roller adapted to slide in the ways, brake shoes mounted upon the roller and adapted to move the roller down the ways by their weight to engage the rails adjacent to the wheels, a trip lever adapted to engage the roller and to hold it in its uppermost position and an arm mounted upon the car and adapted to be moved to engage the roller and return it to its uppermost position.

JAMES A. BROWNFIELD.

Witnesses:
N. C. STACY,
E. W. McCALLISTER.